United States Patent [19]

Santi

[11] Patent Number: 5,007,042
[45] Date of Patent: Apr. 9, 1991

[54] METHOD AND APPARATUS FOR TRANSMITTING ANALOG DATA EMBEDDED IN A DIGITAL PULSE TRAIN

[76] Inventor: Larry D. Santi, 5045 NE. 23rd St., Renton, Wash. 98056

[21] Appl. No.: 404,670

[22] Filed: Sep. 8, 1989

[51] Int. Cl.$^5$ .......................... H03C 1/04; H03K 3/64
[52] U.S. Cl. ........................................... 370/9; 370/10;
370/105.4; 370/112; 375/22; 375/113
[58] Field of Search ................ 370/10, , 9, 112, 105.4,
370/11; 375/22, 113, 117; 340/825.77

[56] References Cited

U.S. PATENT DOCUMENTS

| | | | |
|---|---|---|---|
| 2,724,017 | 11/1955 | Heeren et al. | 370/10 |
| 2,736,772 | 2/1956 | Burnight | 370/10 |
| 3,257,651 | 6/1966 | Feisel | 370/10 |
| 3,991,379 | 11/1976 | Chadwick et al. | 375/113 |
| 4,620,312 | 10/1986 | Yamashita | 375/22 |

Primary Examiner—Douglas W. Olms
Assistant Examiner—Young Tse
Attorney, Agent, or Firm—Seed and Berry

[57] ABSTRACT

A method and apparatus for digitizing and transmitting one or more analog signals simultaneously over a two-wire line. The two-wire line not only provides the power required for the digitizing circuit and sensor, but is used also to transmit the analog information in a digital pulse train encoded with the power supply current. All data pulses are transmitted as the quiescent current of each analog coder module and its associated transducers connected to it. These data pulses start and end by transmission of a digital sync current pulse which separates transmission of each analog data pulse. The width of each data pulse conveys the desired information. A circuit for generating the pulse train having only two amplitudes but pulses having a variable width includes an SR flip-flop coupled to the output stage. The timing of the SR flip-flop being set and reset is determined by the analog data, thus providing an output pulse train having one of two amplitudes and a variable width, the width being proportional to the data conveyed within the pulse train. An analog zero voltage level width pulse and an analog high voltage level width pulse are transmitted in the same pulse train as the analog data to eliminate any temperature or component drifts in sensitive analog-sensing circuits. A formula is given to implement an auto calibration technique.

22 Claims, 5 Drawing Sheets

METHOD AND APPARATUS FOR TRANSMITTING ANALOG DATA EMBEDDED IN A DIGITAL PULSE TRAIN

TECHNICAL FIELD

This invention relates to a method of encoding one or more analog signals simultaneously over a two-wire line.

BACKGROUND OF THE INVENTION

Accurate and reliable transmission of analog electronic data from a source of measurement to a circuit for analysis is required in many applications. If excessive noise is present on the transmission line, analog data is subject to misinterpretation. Further, if the signal becomes too weak or the connection poor, or if components in sensitive analog sensing circuits drift over time, data is lost or is misrepresented. Many of the previous techniques for transmitting analog data over transmission lines were subject to these and other problems.

Two wires are usually required to provide power to an electrically operated sensor used in an existing system. Adding the capability to transmit analog data over existing systems having only two wires is often required. In the past, adapting a two-wire power system to accurately and reliably carry analog data has been difficult. Because a power line is susceptible to noise caused by stray electromagnetic fields, changes in power draw, spikes, and the like, accurate transmission of data over the power line is difficult. The problems of noise in the circuit and on a power line are compounded when sending analog data due to component aging or temperature drifts in sensitive analog sensing circuits, which create false data readings that are difficult or impossible to discover.

Transmitting analog data from multiple sensors to each other or to a central processor over the two-wire power line creates additional significant difficulties. Individual sensors must be identified, both for sending and receiving purposes. The complexity of the system is therefore significantly increased if multiple sensors must transmit data on the same two-wire power line.

SUMMARY OF THE INVENTION

It is therefore an object of this invention to provide a method for encoding and transmitting one or more analog signals in a digital pulse train to ensure accurate and reliable transmission of data.

It is another object of this invention to provide a circuit for digitizing analog data for transmission over a two-wire line with other data and/or power on the same line.

These, and other objects of the invention as will be apparent herein, are accomplished by providing a pulse train signal having two amplitude levels, one for data and one for analog signal identification (sync pulses). Each analog data pulse has the same amplitude as each other and is usually the quiescent power supply current required to drive the analog module and any transducer elements connected to it. Each sync pulse between the analog data pulses has the same amplitude as each other and is a small digital current pulse added to the quiescent current. Thus, the pulse train is termed "a digital pulse train" or simply "a digital signal." The width of each data or sync pulse conveys the information necessary to extract the current reading of one or more analog signals.

A circuit for generating the pulse train includes an SR flip-flop coupled to the output stage. When the output of the flip-flop is high, a sync pulse is being sent. Various circuit elements are also resetting in this same time period in preparation for transmitting data. When the output of the SR flip-flop is low, analog data is being transmitted. The width of the low pulse from the SR flip-flop conveys the data. An integrator being charged from a low threshold point to a high threshold point by the analog data causes the SR flip-flop to switch from low to high (reset to set), respectively, for embedding the analog data into the digital pulse train. An analog zero voltage reference level pulse and an analog high voltage reference level pulse are transmitted in the same pulse train as the analog data in some embodiments, to ensure accurate interpretation of the data, eliminating effects of component drifts in sensitive analog circuits. This technique is later referred to as auto calibration.

DETAILED DESCRIPTION OF THE INVENTION

Figure 1:
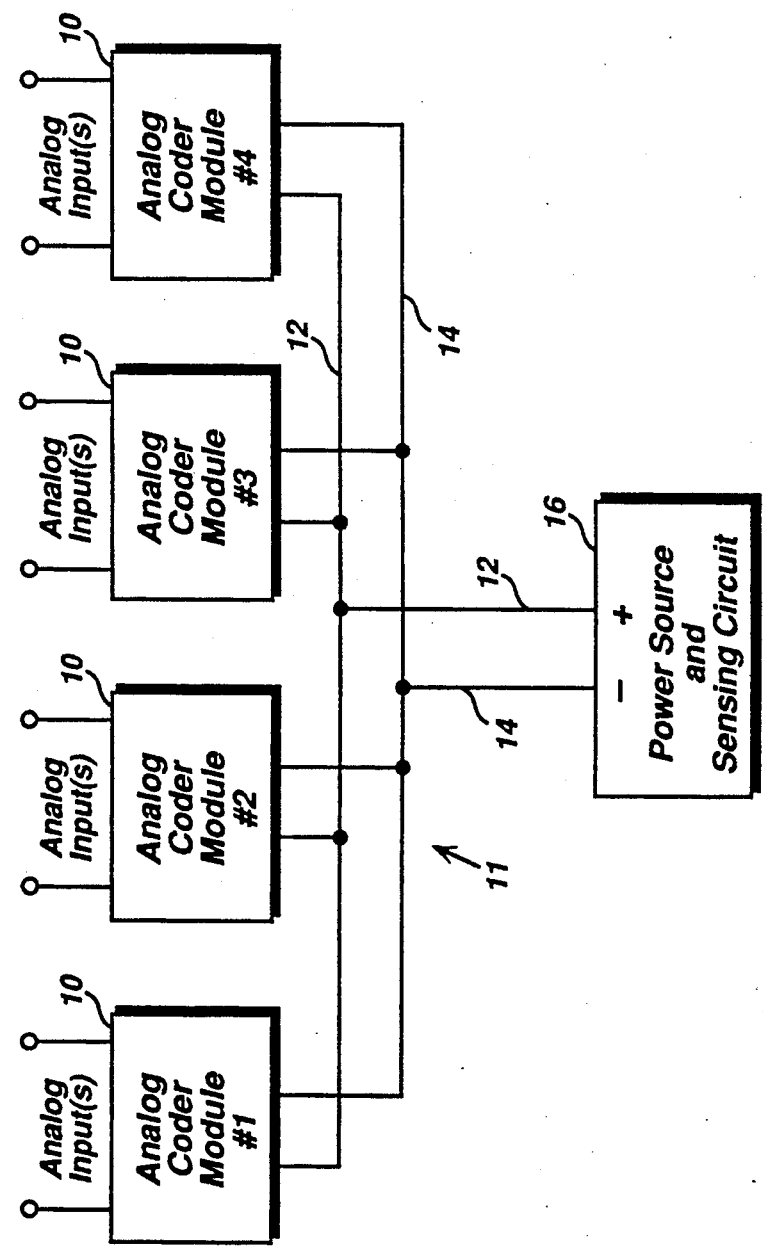
FIG. 1 is a schematic of a plurality of sensors and analog coder modules sharing the same two-wire line for power and transmitting data.

FIG. 1 illustrates a plurality of analog coder modules 10 coupled to a common power and transmission line 11 having a positive line 12 and a ground line 14. The power and transmission line 11 is coupled to a power source and sensing circuit 16. Analog data input from any analog coder module 10 is embedded in a digital pulse train and transmitted to the sensing circuit 16 over line 11, as explained herein.

Figure 4:
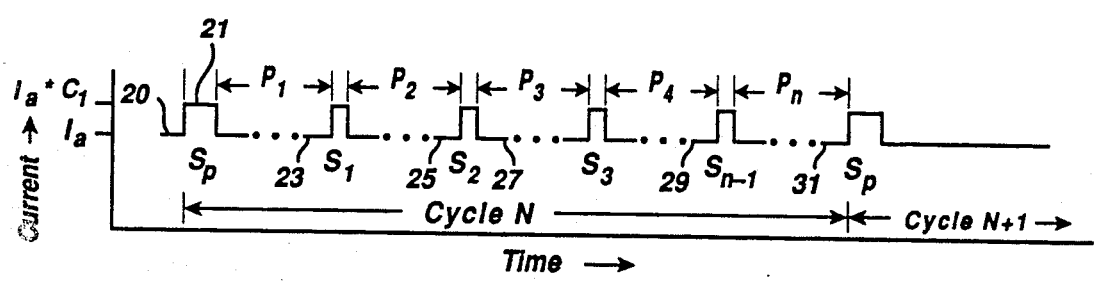
FIG. 4 is a graph of the current amplitude over time of a typical analog coder module generated by the circuit of FIG. 2, transmitting on data channel C1.
Figure 5:
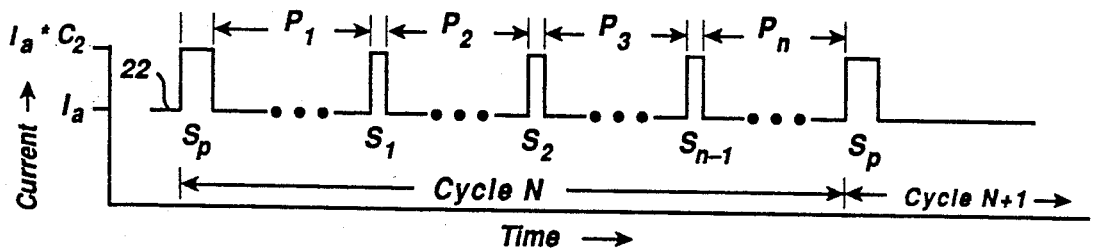
FIG. 5 is a graph of the current amplitude over time of another analog coder module generated by the circuit of FIG. 2, transmitting on data channel C2.

FIGS. 4 and 5 illustrate digital pulse trains 20 and 22 transmitted on line 11 having analog data embedded therein. The digital pulse train 20 includes a plurality of quiescent current data pulses $P_n$ and sync current pulses $S_n$. The sync pulse $S_n$ follows the data pulse $P_n$, sync pulses $S_1$, $S_2$ and $S_3$ being shown in FIGS. 4 and jointly referred to herein as $S_n$. The quiescent current may vary considerably over time within a preselected range as determined based on the operating characteristics of the sensing circuit. The quiescent current may vary based on additional power being drawn by a sensor, a new sensor being coupled to the line or other factors. The quiescent current on the data transmission line may be zero in some embodiments or at some times, such as on a three-wire system having a power line and a dedicated power line. The sync pulse is added to the quiescent current.

The width of the data pulse $P_n$ is the time from the ending of one sync pulse $S_{n-1}$ to the start of the next sync pulse $S_n$, as shown in FIGS. 4 and 5. The width of each data pulse $P_n$ including $P_1$, $P_2$, $P_3$, $P_4$ to $P_n$ having an amplitude of $I_Q$ is proportional to the voltage level of the analog signal input. For a high analog signal input, the width of the pulse $P_n$ is long, whereas for a low analog signal input, the width of the pulse $P_n$ is correspondingly short. The width of the data pulse thus encodes the analog data. The amplitude is the quiescent current level on line 11 of $I_Q$, which is the required current for power if line 11 is also a power line.

The sync pulse $S_n$, has an amplitude $I_Q*C_n$ where $C_n$ is the channel multiplier allocated to that particular analog coder 10. The width of the $S_n$ pulse is not critical and serves to separate data pulses from each other. The first sync pulse, $S_p$, 21 has a width corresponding to the particular address of the analog coder 10 within each channel, and signifies the start of a transmission cycle, as explained more fully herein. The other sync pulses $S_n$ could have a selected width which conveys other information if desired, such as an address of a coder module, timing, or the like. Because the pulse train 20 has only two current levels, $I_Q$ and $I_Q*C_n$, the pulse train is termed a digital signal, even though it carries more than digital data of only "1's" and "0's" in the traditional sense. The analog data is carried as the width of the digital pulses in the pulse train and analog identification data is carried in the width of one or more of the sync pulses.

An auto calibration technique is also possible with this invention.

In one embodiment, a single cycle of digital pulse train 20 contains calibration data as well as the analog data. The width of the first pulse, $P_1$, 23 corresponds to a high reference voltage. The second pulse, $P_2$, 25 contains analog data in that the width corresponds to the voltage level output by the sensor of the analog data. The width of the third pulse, $P_3$, 27 corresponds to a zero reference voltage. Subsequent pulses, $P_4$, 29 to $P_n$, 31 contain analog voltage data.

The transmitted pulse train 20 is received and interpreted by the sensing circuit 16. The sensing circuit 16 includes a processor having a timer or computer of any type well known in the prior art. The sensing circuit 16 measures the width of the data pulses $P_n$ and generates a binary number based on the width. One method useful to measure the width of an incoming pulse is to start a digital timer at the falling edge of the previous channel pulse $S_{n-1}$ and stop the timer at the rising edge of the next channel pulse $S_n$. The digital count on the timer corresponds to the width of the data pulse. The count on the timer can be left in binary code or converted to analog data if desired. The clock rate of the timer is selected to be high enough to permit adequate discrimination of the data and not so high that a wide pulse generates a very high number. The width of $S_p$ or any sync pulse is measured using the same technique. Any sensing circuit capable of measuring the width of each pulse by this or any other method is suitable for use as the sensing circuit 16.

The sensing circuit manipulates and stores the data to automatically compensate the analog data in each cycle for any temperature changes, power supply voltage and current drifts, long-term drifts in the components and other variations in the analog coder module. As previously stated, each cycle of the transmitted pulse train has a high reference voltage pulse and a zero reference voltage pulse. The high reference voltage is proportional to the power supply voltage provided to the analog sensor. Any changes in the power supply voltage to the sensor are reflected in the high reference voltage. The zero reference voltage represents a short circuit or zero voltage input to the analog coder module. Changes just in the encoding circuit components, temperature variations in the encoding circuit, and the like are reflected in the zero reference voltage. The value of the analog signal is determined by the circuit 16 according to the following formula:

$$SIG = K \cdot \left[ \frac{P_{ref}}{P_d} \right] \cdot \left[ \frac{P_d - P_{zero}}{P_{ref} - P_{zero}} \right] \quad (1)$$

Where $P_{ref}$ is the pulse width of the high reference voltage, $P_{zero}$ is the pulse width of the zero reference voltage, $P_d$ is the pulse width of the analog data output from the sensor, K is a scale factor or calibration number and SIG is the digital representation of the analog data as stored and used. Using the data contained in $P_{zero}$ and $P_{ref}$ will auto calibrate or cancel out any zero drift in the components of each analog coder module 10. The span drift only depends on the ratio of resistors 26, 28, and 30. Any other drift in any other component, as long as it does not occur within a single transmission cycle, is effectively removed or cancelled by this auto calibration technique.

The sensing circuit 16 stores the width of each pulse in the pulse train of a single cycle as it is received. At the end of the cycle, the analog data is manipulated according to equation 1 and the value of the analog data is output, either to a visual display, to memory for storage, or the like. Because the signal value, SIG, provided as an output has been calculated using the high and zero reference voltages, circuit noise, temperature variations, component drift, and like noise are automatically removed from the displayed value.

The pulse train 20 includes a synchronous address pulse $S_p$ at the beginning of each cycle and a separator pulse $S_n$ between each data pulse $P_n$. $S_p$ marks the beginning of each cycle. If more than one analog coder module is transmitting on the same data channel, the width of $S_p$ is different for each analog coder module. Upon being received at circuit 16, the width $S_p$ is measured to determine the address of the particular analog coder module from which the data was sent. $S_p$ is generally at least twice as wide as $S_n$. This method is describe later as a burst mode of communication.

The pulse train 22 of FIG. 5 differs from the pulse train 20 of FIG. 4 in that the amplitude of the sync pulses $S_n$ and $S_p$ are twice that of the sync pulses of signal 20 of FIG. 4. For each data channel, the amplitude multiplier $C_n$ is a different value. If a plurality of different devices are on the same line 11, as is shown in FIG. 1, having the channel multiplier $C_n$ different value for each analog coder module 10 permits the sensing circuit 16 to identify the particular set of coder modules 10 from which the signal originated. If there is more than one coder module 10 in a set transmitting on the same data channel, then the width of $S_p$ identifies the unique coder module 10 within that set, based on the unique amplitude of the $S_n$ pulse. Within each data channel, only two amplitudes are present, thus each signal is digital. Each data channel has a unique amplitude.

The pulse trains 20 and 22 may be simultaneously transmitted on the same transmission line 11 if desired. Because the different channels are transmitted simultaneously, many different amplitudes are present on line 14 and received by sensor 16. The sensing circuit 16 separates each channel from the received signal. If the channel pulses $S_n$ overlap the resulting signal is the sum of $C_1+C_2+I_Q(+C_n$, for as many channels as are used simultaneously). The sensing circuit 16 detects the current level of each received signal and, having been programmed with the multiplier for each channel $C_n$, is able to distinguish and separate the signals whether they come alone or overlap. Providing a plurality of timing circuits that stop and start based on the respective falling and rising edges of the channel pulses $S_n$ of a particular amplitude is one reliable method to separate the data as received on a plurality of channels simultaneously. One cycle of current pulses being transmitted on each data channel is thus demultiplexed by the circuit 16, the pulse widths detected and the data extracted for each data channel.

Each analog coder 10 can transmit either in the burst mode or the continuous mode. In the burst mode, an analog coder 10 transmits one cycle of data and then stops. The coder 10 can either be prompted to transmit the burst signal by an address code from the sensing circuit 16 or can do so on a selected schedule. In the continuous mode, shown in FIGS. 4 and 5, the analog coder 10 transmits the reference and measured data in the selected cycle continuously.

Figure 2:
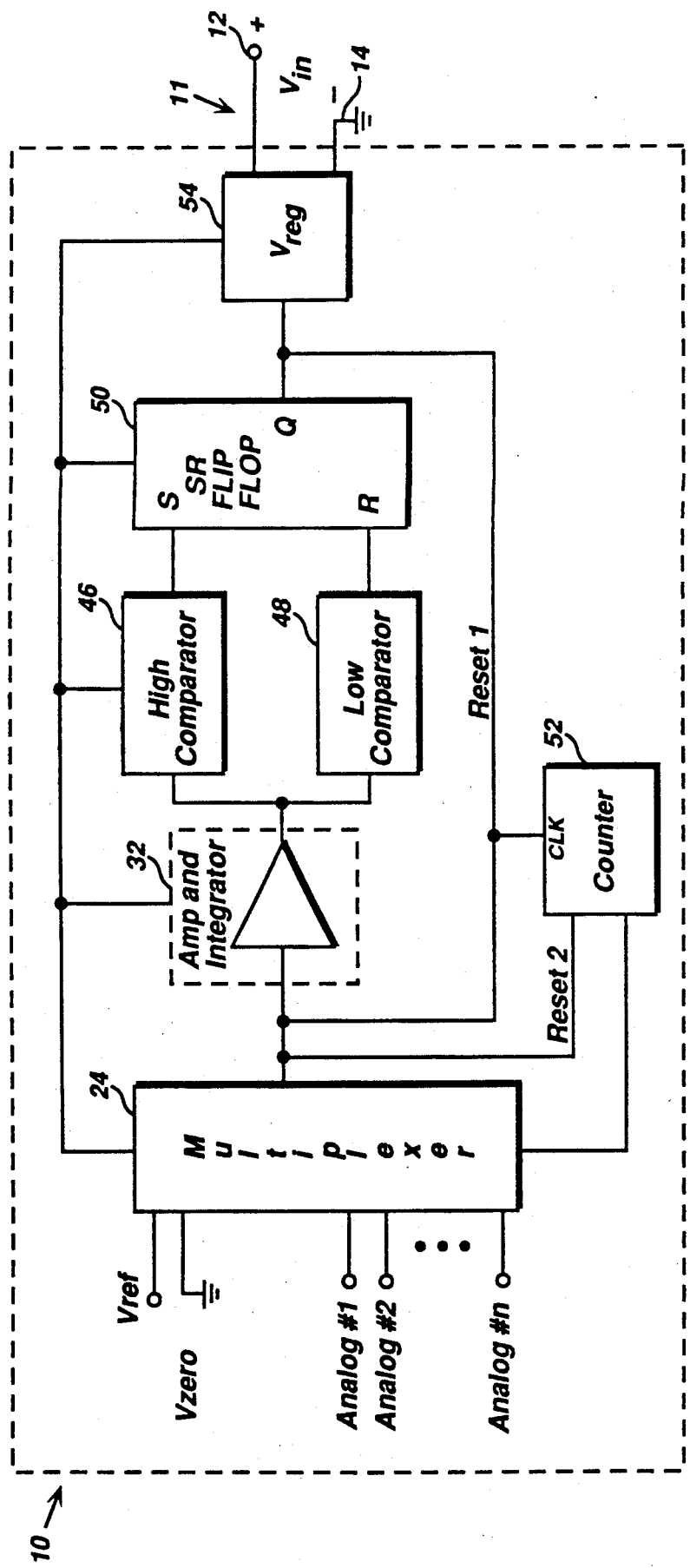
FIG. 2 is a schematic diagram of a circuit for generating a digital signal having analog data therein.
Figure 3A:
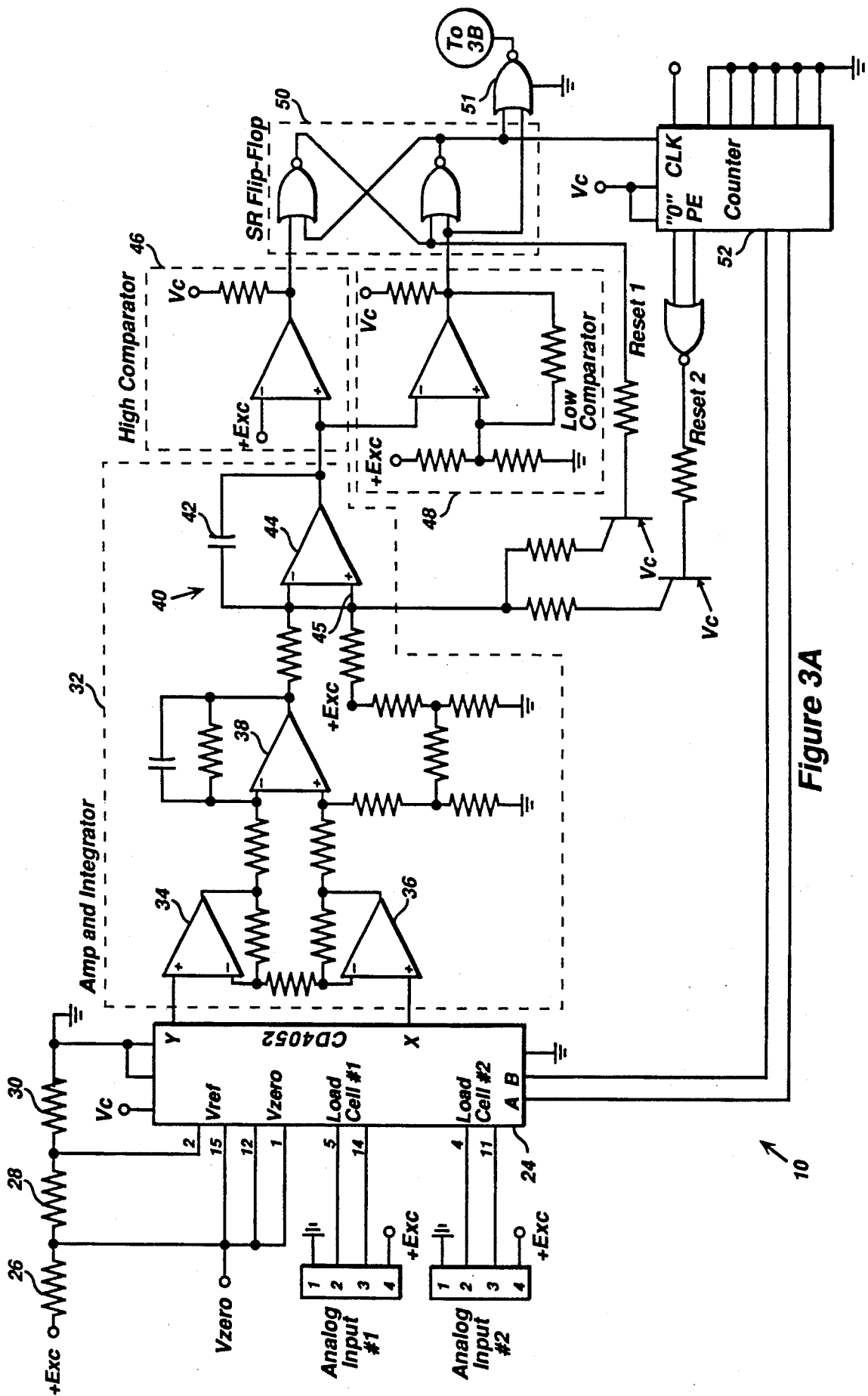
FIGS. 3A and 3B are detailed schematics of the circuit of FIG. 2.
Figure 3B:
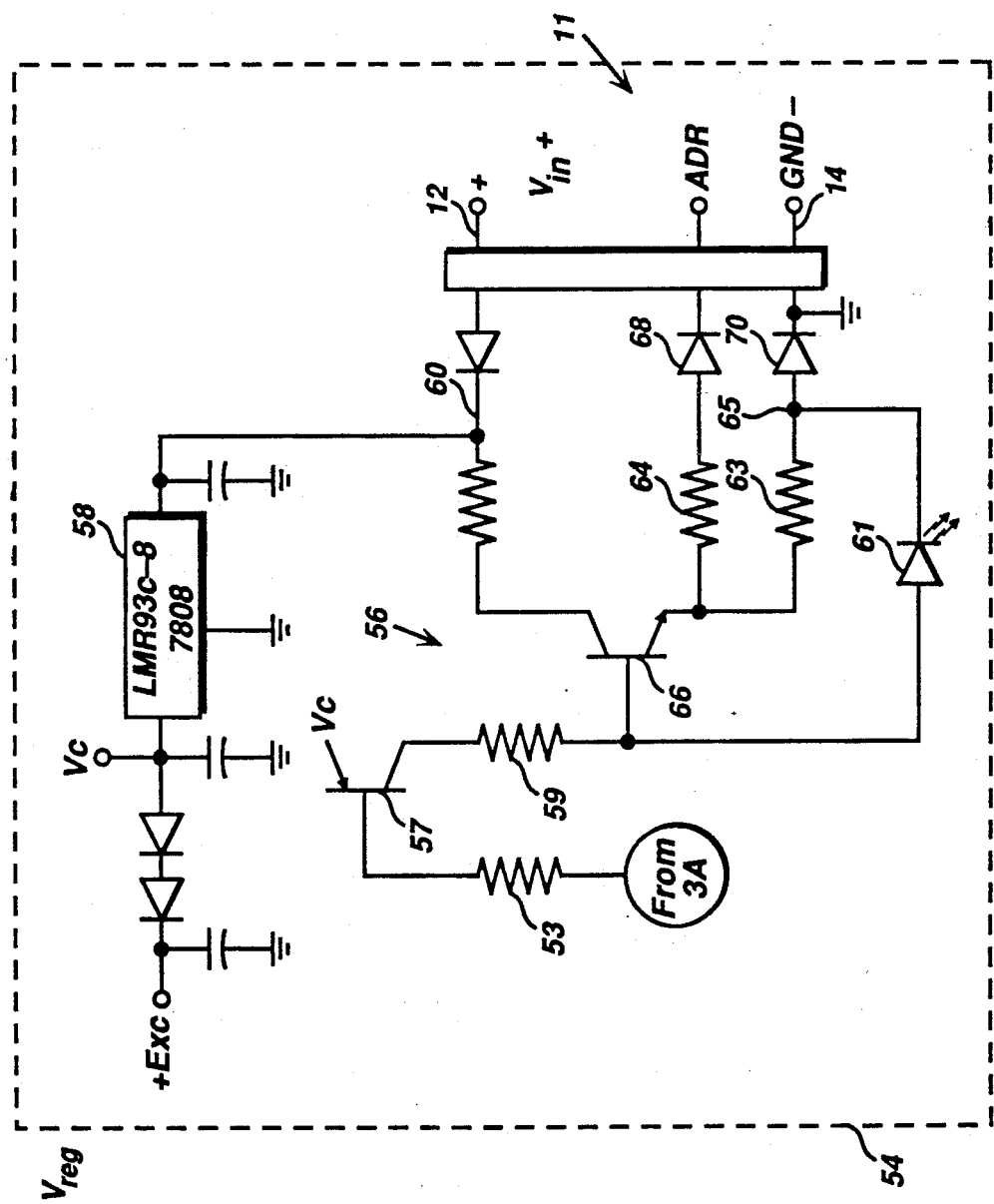

FIGS. 2, 3A, and 3B illustrate a circuit for coder module 10. Analog data is provided on input pins to a multiplexer 24. In one embodiment, the input data is from a standard load cell strain gauge of any type well known in the electronic scale art. The voltage level output from the load cell is proportional to the weight on a load cell signal being sensed by the analog coder module. For a load of 5 tons, the voltage output may be one value, for example, 7 MV. For a load of 10 tons, the voltage will increase to a higher value, for example, 14 MV. The output is analog and is proportional to the load on the electronic scale. The analog input to the multiplexer may be from different load cells to different pins to permit selection.

In the prior art, trucks often include load cells over the axles providing on-board electronic scales. In these prior art devices, the analog signal is transmitted to the cab and displayed. Many prior art systems require 4 or more wires per sensor. The prior art devices do not permit digitizing a signal prior to transmitting it from the axles to the cab. A problem in the prior art is accurately reading this load cell data. This invention permits a coder module 10 to be coupled to in the power or replace the present strain gauge and will transmit data to the driver in the cab using two wires already provided on the truck but being used just for power. The coder module 10 may also be placed within the load cell, adjacent the strain gauge, providing a digital signal having analog data encoded therein from the load cell. Only two wires need be provided to the load cell including both the coder module 10 and strain gauge, a significant improvement over the prior art which required 4 or more wires. Of course, the invention applies to the encoding of any type of data from any source, not just on electronic scale. Data from sources such as flow meters, level transducers, pressure sensors, temperature sensor, or the like may be encoded or transmitted using the techniques and circuit described herein.

As shown in FIG. 3A a reference voltage signal $V_{ref}$ is provided as an input to the multiplexer 24 on lines 2 and 15. In one embodiment, the reference voltage is taken as ratio of the voltage drop from the sensor power excitation voltage $+Exc$ across a single resistor 28 in a resistor network of series resistors 26, 28, and 30 coupled between an excitation voltage and ground. Because the voltage drop across the resistor 28 depends, in part, on the excitation voltage and the value of resistors 26 and 30, Vref includes power supply voltage information and is a ratio of the series resistors. By selection of the resistors 26, 28, and 30 as high-quality components having the same characteristics over time, the ratio remains the same, even though the absolute resistance values may vary. Thus, the integrity of the reference voltage is maintained. The $V_{zero}$ input is provided by tying two input pins, 12 and together. Because the pins are hardwired together, selection of these pins for the output of the multiplexer 24 ensures that the voltage potential between them is always zero. Analog data is input to pins 5 and 14 for one channel and to pins 4 and 11 for another channel. If more channels are needed for analog data, a multiplexer having additional input pins is provided. The high and low reference data voltages and sensor data is always present on the input pins of the multiplexer 24. Interpretation of the data is ensured correct because two reference points, high and low, are transmitted in the pulse train, another feature not possible in the prior art.

The operation of the multiplexer 24 is controlled by a counter 52. More specifically, a signal on lines A and B from counter 52 determines which input signal is provided as the output on lines Y and X of the multiplexer 24.

The output of the multiplexer 24 is input to an amplifier and integrator stage 32. The amplifier and integrator stage 32 includes amplifier and filter circuits 34, 36, and 38 whose operation follows principles well known in the art.

Integrator 40 receives an input from the amplifier stage and integrates by storing charge on capacitor 42, building from a low value to a high value. The rate that the capacitor 42 charges from a low value to a high value is proportional to the difference signal at the input of the operational amplifier 44. The positive input 45 of the operational amplifier 44 is coupled, through a resistor, to the excitation voltage $+Exc$. The output of the integrator 40 thus climbs towards $+Exc$. The negative terminal is coupled to the output from the multiplexer. The rate at which the integrator 40 climbs towards $+Exc$ is proportional to the difference between the output voltage from the multiplexer and $+Exc$. If $V_{zero}$ is the output signal from the multiplexer, the integrator charges rapidly, resulting in a short pulse width $P_n$. If the output signal is a medium or high voltage, the Integrator charges towards $+Exc$ slower according to the voltage difference, resulting in a longer pulse width $P_n$.

The output of the integrator 40 is coupled to the input of a high comparator 46 and a low comparator 48. The output of the high comparator 46 is coupled to the set input of RS flip-flop 50 and the output of the low comparator 48 is coupled to the reset input of the RS flip-flop 50. The integrator 40 begins charging from a low voltage near zero, towards a high voltage. When the output of the integrator 40 exceeds a low threshold voltage, as sensed by the low comparator 48, the SR flip-flop 50 is reset, that is, the output goes low. The charge on the integrator 40 continues to increase at a rate determined by the input signal as previously described. When the output of the integrator 40 exceeds a high threshold voltage, as sensed by the high comparator 46, the SR flip-flop 50 is set, that is, the output goes high. A data pulse $P_n$ having a width proportional to the analog data has thus been sent.

When the output of SR flip-flop 50 goes high, a sync current pulse $S_n$ (or $S_p$) is placed on the output line. Simultaneously, feedback on line reset 1 causes the amplifier and integrator circuit 32 to be reset in preparation for a new integration sequence that will correspond to $P_{n+1}$. The clock on counter 52 is brought high, causing the counter 52 to advance and select the next address in the multiplexer 24. The signal from the SR flip-flop 50 remains high while the circuit 32 is resetting and preparing to integrate the next output signal from the multiplexer 24. When the output from the multiplexer 24 is provided, the integrator 40 has been discharged and begins integration from a low value, often zero, towards the high value again. As the output of the integrator 40 exceeds the low threshold voltage, the low comparator 48 resets the SR flip-flop 50, causing the output to go low and remain low while the integrator 40 charges, thus sending the next data pulse $P_{n+1}$. When the integrator 40 reaches the high threshold voltage, the high comparator 46 goes high, setting the SR flip-flop 50. The sequence continues, following this pattern.

The output of the SR flip-flop 50 being high corresponds to the sync pulses $S_n$ (or $S_p$) and the output of the SR flip-flop 50 being low corresponds to the data pulse $P_n$ of the signal 20 of FIG. 4. Because the time taken for the integrator 40 to traverse from the low threshold voltage to the high threshold voltage is proportional to the voltage of the input signal, the width of the low current pulse $P_n$ is proportional to this voltage. The lower the input voltage, the faster the integrator 40 charges and the shorter the width of the pulse $P_n$. Similarly, the higher the voltage, the longer the integration time and the longer the pulse width $P_n$. An analog voltage is thus converted into an analog pulse having a width proportional to the analog voltage. The width of the low amplitude pulse conveys the analog data. The width of the high amplitude pulse $S_n$ corresponds to the time required to reset the circuit 32, discharge the integrator 40, select a new input signal from the multiplexer 24, and begin charging the integrator 40 from a low value until the low threshold voltage is crossed. The low threshold voltage is somewhat above zero and the high threshold voltage is somewhat below the maximum voltage to which the integrator 40 is charging. The circuit components and integrator 40 are always within a range of stable operation when the analog data is being encoded into a pulse width rather than being near one of the power voltages.

Each time the counter 52 is advanced by the SR flip-flop 50 going high, the address for coupling the next set of inputs to the multiplexer 24 as outputs is selected on address pins A and B. At the end of one entire cycle, the counter 52 is reset to zero and selection of addresses from the multiplexer 24 starts at the beginning. When the counter 52 is reset to zero, the signal for resetting of the amplifier and integrator circuit 32 is sent along line reset 2. Line reset 2 has a selected delay causing the resetting of the circuit 32 to take longer at the beginning of each cycle to generate the leading channel pulse $S_p$. The first sync current pulse in each cycle $S_p$ has a greater width than the other channel pulses $S_n$. The width of the first pulse $S_p$ is selectable by varying the delay in line reset 2. If desired, the delay can be varied for each analog coder module 10 to permit the first set pulse $S_p$ to identify the particular coder 10 transmitting the signal, in addition to marking the beginning of each cycle. This is useful in the burst transmission mode discussed earlier.

As shown in FIG. 3B, the $V_{reg}$ 54 receives the input power on line 11 from the power source and sensing circuit 16. $V_c$ and $+$Exc are provided to power the analog coder and analog sensor (not shown) from the $V_{reg}$ 54 as outputs from a power supply circuit 58. Quiescent current includes the current flowing from node 60 through power supply circuit 58 to provide $+$Exc and $V_c$. Power supply circuit 58 may be any power supply known in the art. Vreg includes a current source circuit 56 which is coupled to the output from the SR flip-flop 50 through NOR gate 51. When the SR flip-flop 50 has a high output, the current drawn from the input load on line 60 is pulled high, creating a sync current pulse $S_n$ of a selected amplitude.

The high current pulse $S_n$ having a selected amplitude is generated in the current source circuit 56 as follows. When the SR flip-flop is high, the output from NOR gate 51 is low. A low output on the NOR gate 51 of FIG. 3A pulls the base of transistor 57 in FIG. 3B low. When the base of the transistor 57 is pulled low, it is turned on and current begins to flow from the emitter to the collector and through resistor 59. The emitter is tied to $V_c$, approximately 8 volts in this embodiment, and the transistor 57 is fully turned on when the base falls below $V_c$ by one junction drop, generally about 0.7 volt less than $V_c$. When the transistor 57 is turned on, it is saturated and the collector reaches approximately 0.2 volt less than the emitter, which, in this embodiment, is approximately 7.8 volts.

Current flows through resistor 59 to the base of transistor 66 and through LED 61. The current flowing through the base of transistor 66 causes the transistor to turn on, pulling current through the collector and from power input line 12, through node 60. Current flows through the transistor 66, through resistor 63, diode 70, and to ground. For channel ADR is not coupled to ground and hence no current flows through resistor 64 and diode 68. Approximately simultaneously with or shortly after transistor 66 turns on, current flows through LED 61. LED 61 has a preselected voltage drop substantially above the voltage drop across the transistor 66. In one embodiment, the voltage drop across LED 61 is 2.4 volts. The voltage at node 65 is held one diode above ground by diode 70. Current flowing through resistor 59 to the base is drawn off by LED 61 to flow through diode 70. The sum of the voltage drops across the transistor 66 and the resistor 63 is equal to the voltage drop across the LED 61. In one embodiment, the voltage drop across the transistor 66 is 0.7 volt and the voltage drop across the LED 61 is 2.4 volts. The voltage drop across the resistor 63 must therefore equal 1.7 volts. The current flowing through resistor 63 will be equal to the ratio of 1.7 volts and the resistance of resistor 63. Even though specific voltage and circuit elements have been shown and described, any circuit achieving the same result, even though using different components, voltages, or current levels falls within this invention. Given the technique of this invention, it is possible to construct many different circuits, some of which may not include an SR flip-flop, a current source circuit or even an integrator. If only one analog input is provided and auto calibration data is not necessary, the analog data may be directly coupled to the amp and integrator circuit 32 without the multiplexer to produce a digital signal having a sync pulse and an analog data encoded in the width of the quiescent current between the sync pulses. On the a single reference voltage may be encoded and transmitted to permit compensation for either zero or span, as desired. Two or more reference voltages may be encoded and transmitted as shown in detail herein. The high current may be the data pulse and the low current the sync pulse, if desired. Many variations are thus possible within the scope of this invention.

The current will be a stable, preselected value based on the selection of the resistance value of resistor 63. The current drawn remains at the selected current value as long as transistor 66 remains on. When the output of the SR flip-flop 50 goes low, the output of the NOR gate 51 is pulled high, to $V_c$. The output of the base of transistor 57 is thus pulled high, approximately to $V_c$, and the transistor 57 is turned off. With transistor 57 turned off, there is no base current provided to transistor 66, which thus remains off. None of the current drawn on power line 12 flows through the collector of the transistor 66; rather, the power required to operate the circuit and the sensor continues to be drawn by voltage regulator 58.

A different current level for a different data channel, such as channel 2, is generated as follows. The ADR node is coupled to ground. A hard-wire connection from ADR to ground, such as a pin extending across the terminals, is a suitable method of grounding ADR. If the transistor 66 is off, no current flows through the emitter from the collector, and hence coupling ADR to ground has no effect on the current drawn for the steady-state power. When transistor 66 is turned on by the SR flip-flop going high, which, in turn, turns on transistor 57, current flows from the collector, through the transistor 66 to the emitter, as previously described. The voltage drop across LED 61 remains the same as when the ADR was not coupled to ground. Therefore, the current flow through parallel resistors 64 and 63 must be sufficiently high to equal the voltage drop across the LED 61 plus the voltage drop across transistor 66. If resistor 64 is equal in value to resistor 63, the effective resistance is half and the current flow is double that of channel 1. Thus, having the ADR coupled to ground causes the current drawn through the collector from the power supply line 12 to be a selected value based on the ratio of the resistors 64 and 63 and different from the value without the ADR coupled to ground. The circuit of FIG. 3B thus illustrates a circuit for increasing the current drawn on line 12 a preselected amount, depending upon the connection of the address pin. The two-wire line not only provides the power required for the coder module 10 and sensor, but is used also to transmit the analog information in a digital pulse train.

Only two data channels are shown as selectable with the circuit of FIG. 3B; however, additional data channels could be added merely by placing additional resistors in parallel with resistors 63 and 64 to increase the current to any number of different selected levels. Those of ordinary skill in the art will be able to connect the resistors and the address pins to achieve any desired number of channels given the description herein. The output of each coder module 10 is thus digital, either high or low, and the width of the low pulse contains the analog data.

Data may be transmitted by this technique on radio frequency waves. The output of the coder module 10 is connectable to a radio transmitter of other signal transmitting device if desired.

I claim:

1. A method of encoding analog data on a two-wire transmission line having a plurality of transmitters coupled to said two-wire transmission line, comprising the steps of:

transmitting a first sync pulse having a selected amplitude and a selected width, said selected amplitude identifying data as being sent by a particular set of transmitters within said plurality of transmitters and said selected width uniquely identifying a particular transmitter within said plurality;

transmitting a data pulse after such first sync pulse, said first data pulse having a first amplitude that is different from said selected amplitude and a width corresponding to the value of said encoded analog data; and transmitting a second sync pulse after said data pulse, said second sync pulse having said selected amplitude, the start of said second sync pulse defining the end of said data pulse.

2. The method according to claim 1, further including transmitting a plurality of second sync pulses and data pulses within a single cycle, a first sync pulse having said selected width defining the beginning of a cycle, each cycle including two analog reference data pulses corresponding to two different reference data values, and one analog data pulse corresponding to analog data.

3. The method according to claim 2 wherein the value of the received analog data within a single cycle is calculated according to the following formula:

$$SIG = K * \left[ \frac{P_d}{P_{ref}} \right] * \left[ \frac{P_{ref} - P_{zero}}{P_d - P_{zero}} \right]$$

where $P_d$ is an analog pulse, $P_{ref}$ is a first reference data value, $P_{zero}$ is a second reference data value, different than said first reference data value, K is a scaling constant for converting to the desired engineering units, and * is a multiplication symbol.

4. The method according to claim 1 wherein said sync pulses are current pulses that are overlaid on top of a quiescent power current, said quiescent power current and said sync current pulses being transmitted over the same two-wire pair, and wherein said first amplitude is equal to said quiescent power current for transmitting data and said selected amplitude is greater than said quiescent power current by a sync factor.

5. The method according to claim 1 wherein said particular set of transmitters includes a single transmitter and thus said selected amplitude identifies a particular transmitter.

6. The method according to claim further including a method of transmitting an analog signal from a different transmitter of said plurality over the same two-wire pair transmission line, comprising;

transmitting a first sync pulse having a second selected amplitude and a selected width, said second selected amplitude identifying data as being sent by a different particular set of transmitters within said plurality of transmitters, said second selected amplitudes being different from said selected amplitude;

transmitting a second data pulse after said first sync pulse of said second selected amplitude, said second data pulse having said first amplitude;

transmitting a second sync pulse after said second data pulse, said second sync pulse having said second selected amplitude;

transmitting a second data pulse after said second sync pulse, said second data pulse having said first amplitude;

transmitting a third sync pulse having said second selected amplitude; and transmitting a third data pulse after said third sync pulse, said third data pulse having said first amplitude.

7. The method according to claim 6, further including transmitting two signals simultaneously on said two-wire pair transmission line, each of said signals representing data from different sets of transmitters.

8. A circuit for transmitting a signal on a two-wire transmission line from one of a plurality of transmitters coupled to said transmission line, comprising:

an integrator;

a multiplexer having an output coupled to said integrator;

an analog signal source coupled to the input of said multiplexer; and a switching means for placing a signal on said two-wire transmission line, said switching means being coupled to the output of said integrator, said switching means placing a sync pulse having a selected amplitude on said two-wire transmission line when the charge on said integrator exceeds a high threshold value or is less than a low threshold value and placing a data pulse having a first amplitude different from said selected amplitude on said two-wire transmission line when the charge on said integrator exceeds said low threshold value but is less than said high threshold value, said selected amplitude identifying said signal as being generated by a select set of transmitters coupled to said transmission line.

9. The circuit according to claim 8 wherein the time required for the output of said integrator to charge from said low threshold value to said high threshold value is determined by the value of an analog data signal coupled through said multiplexer to said integrator, thus creating a data pulse whose width corresponds to the value at said analog data.

10. The circuit according to claim 8 wherein said switching means includes an SR flip-flop which is set to output a high signal when the charge on said integrator exceeds said high threshold value or is less than said low threshold value and is reset to output a low signal when the charge on said integrator exceeds said low threshold value but is less than said high threshold value.

11. The circuit according to claim 10 wherein said switching means further includes a current source coupled to said two-wire transmission line for drawing a selected current based on said selected set of transmitters.

12. The circuit according to claim 11 wherein said two-wire transmission line also conveys power to said circuit and the amplitude of said data pulse equals the amplitude of the current for powering circuits coupled to said transmission line.

13. The circuit of claim 8, further including:

a multiplexer having its output coupled to said integrator;

a reference signal source coupled to the input of said multiplexer; and address selecting means for selecting either said analog signal or said reference signal as the output of said multiplexer.

14. The circuit according to claim 13, further including a second reference signal source having a voltage less than said first reference signal source coupled to the input of said multiplexer 15. The circuit according to claim 13 wherein the integrator is reset and the next address of the inputs of said multiplexer is selected as the output when the charge of said integrator exceeds said high threshold voltage.

16. A method of encoding analog data, comprising:

a. generating an initial sync pulse having a selected amplitude and a selected width, the initial sync pulse indicating the beginning of an encoding cycle;

b. generating a data pulse immediately following the generation of the initial sync pulse, the data pulse having a first amplitude, and a width proportional to the value of the encoded data, the encoded data being transmitted on a two-wire transmission line having a plurality of analog data signals from different sources on said two-wire transmission line, and the amplitude of said sync pulse uniquely identifying a source of said data;

c. generating a sync pulse immediately following the generation of said data pulse, the ending of said initial sync pulse and the beginning of the next sync pulse defining the width of said analog data pulse; and d. repeating steps b and c until said next sync pulse is an initial sync pulse indicating the beginning of a different encoding cycle.

17. The method according to claim 16 where the data pulse amplitude equals a quiescent current on a transmission line.

18. The method according to claim 16 wherein at least one of said data pulses includes reference voltage data.

19. A method of encoding analog data on a two-wire transmission line having a plurality of transmitters coupled to said two-wire transmission line, comprising the steps of:

transmitting a first sync pulse having a selected amplitude and a selected width, said selected amplitude identifying data as being sent by a particular set of transmitters within said plurality of transmitters;

transmitting a second sync pulse having a second selected amplitude and a second selected width, said second selected amplitude identifying data as being sent by a different particular set of transmitters within said plurality of transmitters from that identified by said first sync pulse, said second selected amplitude being different from said selected amplitude;

transmitting a data pulse after said first sync pulse, said first data pulse having a first amplitude that is different from said selected amplitude and a width corresponding to the value of said encoded analog data;

transmitting a second data pulse after said second sync pulse of said second selected amplitude, said second data pulse having said first amplitude;

transmitting a first data separator pulse after said first data pulse, said first data separator pulse having said selected amplitude, the start of said first data separator pulse defining the end of said data pulse; and transmitting a second data separator pulse after said second data pulse, said second data separator pulse having said second amplitude, the start of said second data separator pulse defining the end of said second data pulse.

20. A circuit for transmitting encoded data on a two-wire transmission line from a plurality of transmitters coupled to said two-wire transmission line, comprising:

a first sync pulse generating circuit means for generating a first sync pulse having a first amplitude and a selected width, the sync pulse indicating the beginning of an encoding cycle for a first transmitter coupled to said two-wire transmission line;

first data pulse generating means for generating a plurality of first data pulses following the generation of said sync pulse, said first data pulse having a selected amplitude, different from said sync pulse amplitude and a width corresponding to the analog value of first encoded data;

second sync pulse generating circuit means for generating a second sync pulse having a second amplitude different from said first amplitude, said second sync pulse indicating the beginning of an encoding cycle for a second transmitter coupled to said two-wire transmission line;

second data pulse generating means for generating a plurality of second data pulses following the generation of said second sync pulse, said second data pulse having a selected amplitude and a width proportional to the analog value of second encoded data;

first separator pulse circuit means for generating first separator pulses between said first data pulses and first separator pulses having said first amplitude; and second separator pulse circuit means for generating second separator pulses between said second data pulses, said second separator pulses having said second amplitude.

21. The circuit according to claim 20 wherein said first data pulse circuit means includes an integrator which varies the width of said first data pulse based on the value of the analog data provided as an input to said integrator.

22. The circuit according to claim 20 wherein said first amplitude is the same as said second amplitude.

* * * * *

UNITED STATES PATENT AND TRADEMARK OFFICE
CERTIFICATE OF CORRECTION

PATENT NO. : 5,007,042

DATED : April 9, 1991

INVENTOR(S) : Larry D. Santi

It is certified that error appears in the above-identified patent and that said Letters Patent is hereby corrected as shown below:

In column 10, claim 6, line 57, after "claim" please insert -- 1,--.

Signed and Sealed this

Eighth Day of December, 1992

*Attest:*

DOUGLAS B. COMER

*Attesting Officer*  *Acting Commissioner of Patents and Trademarks*